United States Patent
Haensgen et al.

(10) Patent No.: US 10,126,799 B2
(45) Date of Patent: *Nov. 13, 2018

(54) INTELLIGENT POWER TAP WITH ZONE CONTROL AND SAFETY ZONE CONTROL

(71) Applicant: ROCKWELL AUTOMATION TECHNOLOGIES, INC., Mayfield, WI (US)

(72) Inventors: Steven T Haensgen, Mukwonago, WI (US); John P Caspers, Racine, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 49 days.

This patent is subject to a terminal disclaimer.

(21) Appl. No.: 15/217,355

(22) Filed: Jul. 22, 2016

(65) Prior Publication Data

US 2018/0024605 A1    Jan. 25, 2018

(51) Int. Cl.
| | |
|---|---|
| *G06F 1/26* | (2006.01) |
| *G06F 13/36* | (2006.01) |
| *G06F 13/362* | (2006.01) |
| *G05B 19/042* | (2006.01) |
| *G05B 19/418* | (2006.01) |
| *H02J 1/08* | (2006.01) |

(Continued)

(52) U.S. Cl.
CPC .............. *G06F 1/266* (2013.01); *G05B 9/02* (2013.01); *G05B 19/042* (2013.01); *G05B 19/0425* (2013.01); *G05B 19/418* (2013.01); *G06F 13/362* (2013.01); *H02J 1/08* (2013.01); *H02J 13/0003* (2013.01)

(58) Field of Classification Search
CPC .............................. G06F 1/266; G06F 13/362
See application file for complete search history.

(56) References Cited

U.S. PATENT DOCUMENTS

| 4,095,862 A | 6/1978 | Hatch |
|---|---|---|
| 4,252,396 A | 2/1981 | Wilson |

(Continued)

FOREIGN PATENT DOCUMENTS

| CN | 2648674 | 10/2004 |
|---|---|---|
| EP | 1967929 A2 | 10/2008 |

(Continued)

OTHER PUBLICATIONS

Siemens, Simatic Net, AS-Interface—Introduction and Basics Manual, Release Apr. 2006, 62 pages.

(Continued)

*Primary Examiner* — Stefan Stoynov
(74) *Attorney, Agent, or Firm* — Quarles & Brady LLP (57) ABSTRACT

Systems and methods for providing diagnostic information by an intelligent power tap is disclosed. The intelligent power tap includes a circuit board. The intelligent power tap includes a microcontroller disposed on the circuit board, where the microcontroller is configured to report the geographical location of the intelligent power tap. The intelligent power tap includes a physical layer network interface connected to the microcontroller and the physical network. The intelligent power tap includes a switch controlled by the microcontroller, where the switch is capable of shutting off a network power to be injected into the network system.

14 Claims, 7 Drawing Sheets

(51) Int. Cl.
*H02J 13/00* (2006.01)
*G05B 9/02* (2006.01)

(56) References Cited

U.S. PATENT DOCUMENTS

| | | |
|---|---|---|
| 4,359,257 A | 11/1982 | Lopinski et al. |
| 4,641,904 A | 2/1987 | Kosugi et al. |
| 4,773,876 A | 9/1988 | Nakamura et al. |
| 5,059,137 A | 10/1991 | Dale et al. |
| 5,242,313 A | 9/1993 | Logerot et al. |
| 5,242,314 A | 9/1993 | Di Giulio et al. |
| 6,074,238 A | 6/2000 | DeRoss et al. |
| 6,232,557 B1 | 5/2001 | Lounsbury et al. |
| 6,394,833 B1 | 5/2002 | Bulmer et al. |
| 6,400,103 B1 | 6/2002 | Adamson |
| 6,425,770 B1 | 7/2002 | Lostoski et al. |
| 6,442,144 B1 | 8/2002 | Hansen et al. |
| 6,732,202 B1 | 5/2004 | Ying |
| 6,935,885 B2 | 8/2005 | Scherer et al. |
| 7,080,150 B1 | 7/2006 | Wehrle et al. |
| 7,112,073 B2 | 9/2006 | Morlok |
| 7,228,363 B1 | 6/2007 | Wehrle et al. |
| 7,313,607 B1 | 12/2007 | Rosenberg |
| 7,412,530 B1 | 8/2008 | Wehrle et al. |
| 7,483,396 B2 | 1/2009 | Steindl |
| 7,721,079 B2 | 5/2010 | Wehrle et al. |
| 8,433,827 B2 | 4/2013 | Biehler |
| 9,813,290 B2 | 11/2017 | Saltsidis |
| 9,876,674 B1 | 1/2018 | Murray et al. |
| 2002/0184573 A1 | 12/2002 | Rousseau et al. |
| 2004/0158713 A1 | 8/2004 | Aneweer et al. |
| 2005/0024026 A1 | 2/2005 | Hung et al. |
| 2005/0021738 A1 | 4/2005 | Goeller et al. |
| 2005/0243739 A1 | 11/2005 | Anderson et al. |
| 2005/0262218 A1 | 11/2005 | Cox et al. |
| 2008/0192650 A1 | 11/2008 | Kolhi |
| 2008/0281947 A1 | 11/2008 | Kumar |
| 2009/0198385 A1 | 8/2009 | Oe et al. |
| 2009/0205022 A1 | 8/2009 | Sanchez et al. |
| 2010/0030345 A1 | 2/2010 | Cole et al. |
| 2010/0186229 A1 | 7/2010 | Enomoto et al. |
| 2010/0205271 A1 | 8/2010 | Porter et al. |
| 2010/0205281 A1 | 8/2010 | Porter et al. |
| 2011/0222200 A1 | 9/2011 | Fuller et al. |
| 2012/0066356 A1 | 3/2012 | Nguyen et al. |
| 2012/0253540 A1 | 10/2012 | Coyne |
| 2012/0258726 A1 | 10/2012 | Bansal et al. |
| 2013/0073760 A1 | 3/2013 | Wiesgickl |
| 2013/0275566 A1 | 10/2013 | Huth et al. |
| 2013/0288640 A1 | 10/2013 | Bonner |
| 2014/0258455 A1 | 9/2014 | Julicher |
| 2014/0280881 A1 | 9/2014 | Szamonek et al. |
| 2015/0117244 A1 | 4/2015 | Williamson |
| 2015/0201101 A1 | 7/2015 | Kaminushi |
| 2015/0256389 A1 | 9/2015 | Ruess et al. |
| 2015/0350229 A1 | 12/2015 | Mitchell |
| 2016/0013948 A1 | 1/2016 | Moses |
| 2016/0070282 A1 | 3/2016 | Chapel et al. |
| 2016/0139999 A1 | 5/2016 | Gabler et al. |
| 2016/0006628 A1 | 7/2016 | Herring et al. |
| 2016/0269373 A1 | 9/2016 | White et al. |
| 2017/0025892 A1* | 1/2017 | Van Ostrand ...... G01R 19/2513 |
| 2017/0026441 A1 | 1/2017 | Moudy et al. |
| 2017/0134477 A1 | 7/2017 | Ben Dayan |
| 2017/0237556 A9 | 8/2017 | Denning et al. |
| 2017/0272452 A1 | 9/2017 | Kraemer et al. |
| 2017/0303079 A1 | 10/2017 | Ikemoto et al. |

FOREIGN PATENT DOCUMENTS

| | | |
|---|---|---|
| EP | 1983616 A2 | 10/2008 |
| GB | 2442304 B | 10/2008 |
| KR | 1020110017576 A | 2/2011 |
| WO | 03023634 A1 | 3/2003 |
| WO | 2006089718 A2 | 8/2006 |
| WO | 2009150527 A1 | 12/2009 |

OTHER PUBLICATIONS

European Search Report, Appln No. 17178252.7-1804; dated Jan. 3, 2018; 17 pages.
Anderson P M et al., Automated Power Distribution System Hardware, Aug. 6, 1989; pp. 579-584.
CN 2648674 Machine Translated Abstract.
Brian Burgess: "How to Assign a Static IP Address in Windows 7, 8, 10, XP, or Vista", Nov. 10, 2013 (Nov. 10, 2013), pp. 1-17, XP055427798, Retrieved from the Internet: URL:https://www.howtogeek.com/howto/19249/how-to-assign-a-static-ip-address-in-xp-vista-or-windows-7/ [retrieved on Nov. 22, 2017] the whole document.
Glenn Satchell: "How can I configure a DHCP server to assign addresses based on the OS that is running", May 21, 2010 (May 21, 2010), pp. 1-9, XP055427854, Retrieved from the Internet: URL:https://lists.isc.org/pipermail/dhcp-users/2010-May/011783.html [retrieved on Nov. 22, 2017] the whole document.
Peter Matray et al: "On the network geography of the Internet", Infocom, 2011 Proceedings IEEE, IEEE, Apr. 10, 2011 (Apr. 10, 2011, pp. 126-130, XPO31953298, DOI: 10.1109/INFCOM.2011.5934909 IBSN: 978-1-42244-9919-9 abstract; figure 1.
European Search Report; Appln No. 17177835.0-1804; dated Jan. 2, 2018; 10 pages.
European Search Report; Appln No. 17178258.4-1808; dated Dec. 20, 2017; 9 pages.
Moyne, et al., The Emergence of Industrial Control Networks for Manufacturing Control, Diagnostics, and Safety Data, Proceedings of the IEEE, 2007, 95(1):29-47.
European Patent Office, Extended European Search Report, EP 17178251.9, dated Sep. 27, 2017; 8 pages.
European Patent Office, Extended European Search Report, EP 17178252.7, dated Mar. 27, 2018; 18 pages.
European Patent Office, Extended European Search Report, EP 17178254.3, dated Oct. 5, 2017, 8 pages.
European Patent Office, Extended European Search Report, EP 17178256.8, dated Nov. 30, 2017, 7 pages.

* cited by examiner

INTELLIGENT POWER TAP WITH ZONE CONTROL AND SAFETY ZONE CONTROL

BACKGROUND

The subject matter disclosed within relates generally to a device in a control system, and more particularly to an intelligent power tap with zone control and safety zone control.

Control systems are at the core of modern manufacturing. These systems control diverse processes from steel and automotive products to mass distribution products associated with food and beverages, for example. In general, control systems require a processor and related program to direct a related system of Input/Output (I/O) interfaces (e.g., I/O modules) which in turn report and control industrial processes. I/O modules may be selected to perform digital style (e.g., 120V input/output) and/or analog style control (e.g., 4-20 ma input/output), for example. Also, generally associated with control systems are related racks, power supplies and control networks for housing, powering, and communicating with the associated I/O modules.

Over time, industrial system demands have steadily increased. For example, system demands for lower costs and increased flexibility are increasingly necessary for modern factories to compete on the global stage. Lower system costs provide manufacturers with a competitive advantage by realizing a better return on capital investments. Flexibility enables a manufacturer to respond to changing market dynamics as product and sales requirements change. Unfortunately, conventional systems many times are burdensome to install/upgrade and often require manufacturer's to install more system components than necessary. Thus, conventional systems generally do not provide the requisite flexibility and associated lower costs required by modern systems.

One of the solutions that addresses the above increased demands is the emergence of industrial control networks for communicating control and status data between industrial controllers and devices used in control systems such as I/O devices, motor starters, relays, push buttons, drives, etc. These industrial control networks have provided the ability to improve flexibility, increase diagnostics, reduce installation and wiring cost, ease maintainability and generally improve the productivity of manufacturing operations.

These same motivations are also driving the implementation of industrial safety networks. These safety networks allow manufacturers to distribute and intermingle standard and safety devices around their machinery using a single network cable, reducing installation costs while improving diagnostics and enabling safety systems of increased complexity. They also enable safe communications between Safety PLCs/controllers, allowing users to distribute their safety control among several intelligent systems.

However, in current networked industrial control systems and in current safety networked control systems, technical challenges exist when trying to efficiently control or shutoff multiple devices in a zone. In current systems, remote zone control or safety zone control is not supported.

Thus, there is a need for providing an intelligent power tap with remote zone control and safety zone control.

BRIEF SUMMARY OF THE INVENTION

The above problems can be solved by providing an intelligent power tap with communication capabilities so remote zone control is possible, and with the addition of a safety core, safety zone control is possible.

In one aspect, the present disclosure provides an intelligent power tap. The intelligent tap includes a circuit board and a microcontroller disposed on the circuit board. The microcontroller is configured to report the geographical location on the network of the intelligent power tap. The intelligent tap includes a physical layer network interface connected to the microcontroller and the network system. The intelligent tap further includes a switch controlled by the microcontroller, where the switch is capable of injecting or shutting off a network power into the network system. The intelligent power tap may include a second switch that is capable of injecting or shutting off the switched power into the network system.

In some embodiments, the microcontroller is configured to shut off the network power and broadcast a third warning message over the network system when determining that the network current is not within a first preset current range for a first preset period of time; and wherein the first preset current range is defined by a first and second current thresholds.

In some embodiments, the microcontroller is configured to shut off the switched power and broadcast a fourth warning message over the network system when determining that the switched current is not within a second preset current range for a second preset period of time; and wherein the second preset current range is defined by a third and fourth current thresholds.

In another aspect, the present disclosure provides an intelligent safety power tap for use in a standard or safety network system. The intelligent safety power tap includes a circuit board and a safety core on the circuit board. The safety core includes one or more microcontrollers, where the safety core is capable of obtaining a safety message from the safety network system. The intelligent safety power tap includes a physical layer network interface connected to the safety core and the safety network system. The intelligent safety power tap also includes a safety switch or redundant switches controlled by the safety core, where the safety switch or redundant switches are capable of shutting off power for at least one of a network power zone and a switched power zone in the safety network system.

In yet another aspect, the present disclosure provides a safety network system. The safety network system includes a network power zone and a switched power zone, including one or more safety or standard control devices. The safety network system also includes an intelligent safety power tap which includes a safety core configured to obtain a safety message from the safety network system. The intelligent safety power tap can be configured to send one or more safety or control devices in the network power zone to a safe or known state by shutting off network power to the one or more safety or control devices in the network power zone. Similarly, the intelligent safety power tap can be configured to send one or more safety or control devices in the switched power zone to a safe or known state by shutting off switched power to the one or more safety or control devices in the switched power zone.

In some embodiments, the intelligent safety power tap further comprises a switched voltage sensor that senses a switched voltage to be injected into the switched power zone; and wherein the intelligent safety power tap sends a second over-voltage warning when the sensed switched voltage is greater than a third voltage threshold.

In some embodiments, the intelligent safety power tap sends a second under-voltage warning when the sensed switched voltage is less than a fourth voltage threshold.

In some embodiments, the intelligent safety power tap further comprises a incoming voltage sensor that senses incoming voltage to the power tap; and wherein the intelligent safety power tap sends a third over-voltage warning when the sensed incoming voltage is greater than a fifth voltage threshold.

In some embodiments, the intelligent safety power tap sends a third under-voltage warning when the sensed incoming voltage is less than a sixth voltage threshold.

These and other benefits may become clearer upon making a thorough review and study of the following detailed description. Further, while the embodiments discussed above can be listed as individual embodiments, it is to be understood that the above embodiments, including all elements contained therein, can be combined in whole or in part.

BRIEF DESCRIPTION OF DRAWINGS

The disclosure will be better understood and features, aspects and advantages other than those set forth above will become apparent when consideration is given to the following detailed description thereof. Such detailed description makes reference to the following drawings.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION OF THE INVENTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the use the phraseology and terminology used herein is for the purpose of description and should not be regarded as limiting. Furthermore, the use of "right", "left", "front", "back", "upper", "lower", "above", "below", "top", or "bottom" and variations thereof herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may include used herein to describe various information, the information should not be limited by these terms. These terms are only used to distinguish one category of information from another. For example, without departing from the scope of the present disclosure, first information may include termed as second information; and similarly, second information may also be termed as first information. As used herein, the term "if" may include understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may include combined in any suitable manner.

The following discussion is presented to enable a person skilled in the art to make and use embodiments of the disclosure. Various modifications to the illustrated embodiments will be readily apparent to those skilled in the art, and the generic principles herein can be applied to other embodiments and applications without departing from embodiments of the disclosure. Thus, embodiments of the disclosure are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the disclosure. Skilled artisans will recognize the examples provided herein have many useful alternatives and fall within the scope of embodiments of the disclosure.

Figure 1A:
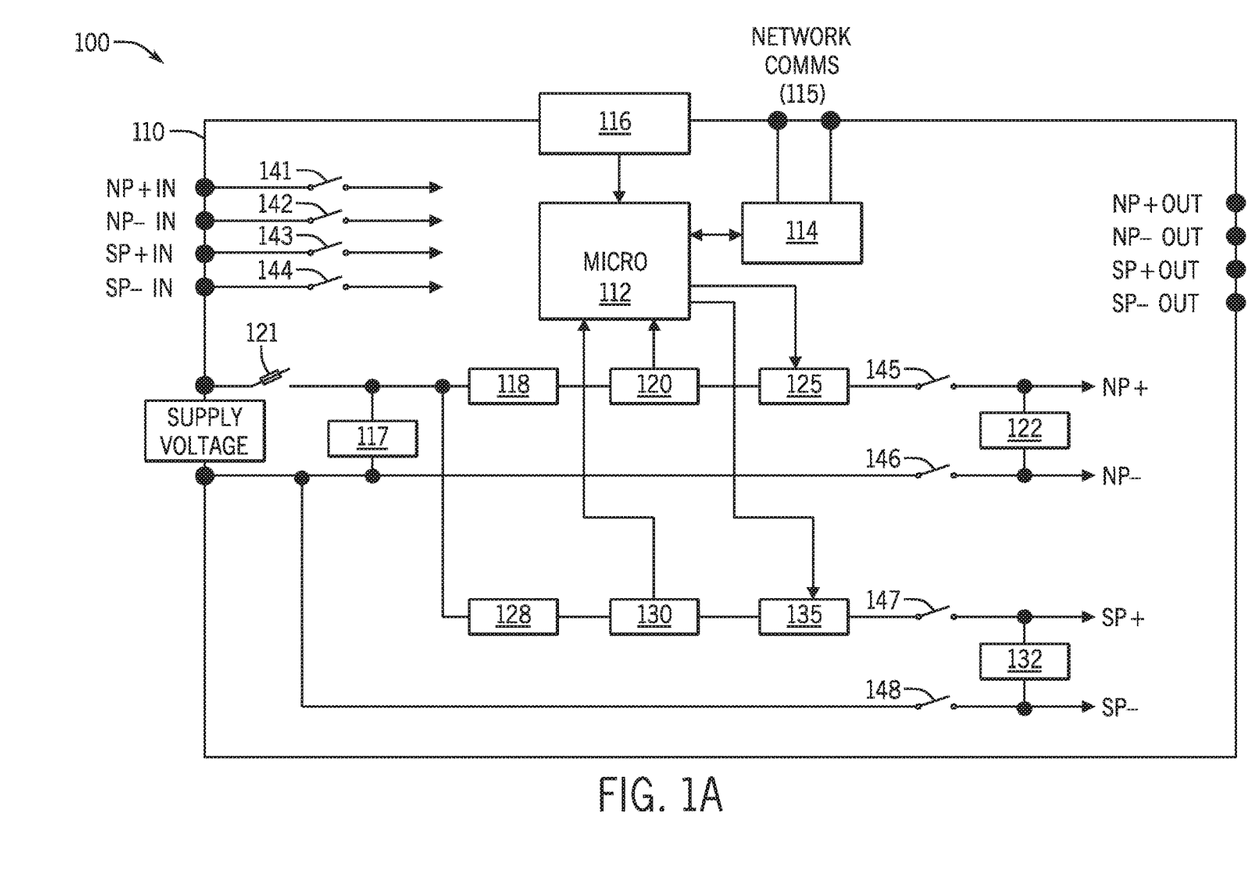
FIG. 1A illustrates a first example intelligent power tap according to one or more embodiments of the instant application.

FIG. 1A illustrates an example intelligent power tap according to one or more embodiments of the instant application. In FIG. 1A, the intelligent power tap 100 may be connected to a network system. The intelligent power tap 100 includes a circuit board 110, a microcontroller 112 disposed on the circuit board 110, and a physical layer network interface 114 connected to the microcontroller 112 and the network system. The circuit board 110 may include one or more layers of printed circuit boards (PCB). The microcontroller 112 may include one or more central processing units, which may also be referred as microprocessor, or host processor, etc. Generally, the microcontroller 112 decides what the received messages mean, what messages it wants to transmit, and what acts to be performed after receiving a certain message.

For example, the physical layer network interface 114 may be connected to a control network system via the Network Comms terminals 115 of the intelligent power tap 100. When receiving a request to provide a status report to another device on the control network system, the microcontroller 112 may send a status report to the requesting device.

The microcontroller 112 communicates as a network node via the network bus connected to a physical layer of the network system. The microcontroller 112 is configured to report the geographical location of the intelligent power tap on the network cable, just as all other nodes in the network system may be capable of reporting their geographical location. Here, the geographical location may indicate the left-to-right sequential location of the device on the network cable. Thus, the other connected devices in the network may obtain the geographical location of the intelligent power tap in the network system.

The intelligent power tap 100 is configured to inject at least one of a network power and a switched power into the network system. The network power may be injected with a supply voltage, such as 24 Vdc, and a maximum current, such as 4 A, via the intelligent power tap, which may be used to power communication electronics, Inputs/Outputs, and etc. The switched power may be injected with a supply voltage, such as 24 Vdc, and a maximum current, such as 4 A, via the intelligent power tap 100 as well. The switched power may be used to power contactors, relays, and other switching devices/circuits.

The microcontroller 112 may be connected to a first voltage sensor 117, a second voltage sensor 122 and a third voltage sensor 132. The first voltage sensor 117 is an incoming voltage sensor that senses an incoming voltage to the intelligent power tap. The second voltage sensor 122 is a network voltage sensor that senses a network voltage to be injected into the network system. The third voltage sensor 132 is a switched voltage sensor that senses a switched voltage to be injected into the network system. The intelligent power tap 100 may include additional voltage sensors to measure other voltage signals in the intelligent power tap 100. Based on the sensed voltage signals from the various voltage sensors, the microcontroller 112 may shut off the power output to the network power zone or the switched power zone. Similarly, the user is also provided with ability to shut off or de-energize an entire zone of network power or switched power via a network command. The user may choose to shut off an entire zone for energy saving reasons, safety reasons, regular maintenance, or any other reasons.

The microcontroller 112 may be configured to shut off the network power and broadcast a first warning message over the network system when determining that the network voltage is not within a first preset voltage range for a preset period of time, where the first preset voltage range is defined by a first and second voltage thresholds. The first and second voltage thresholds may include a lower threshold and a higher threshold, which delimit the proper working voltage range of the control device connected to the network power output. The microcontroller 112 may be configured to shut off the switched power and broadcast a second warning message over the network system when determining that the switched voltage is not within a second preset voltage range for a preset period of time, where the second preset voltage range is defined by a third and fourth voltage thresholds. The third and fourth voltage thresholds may include a lower threshold and a higher threshold, which delimit the proper working voltage range of the control device connected to the switched power output.

The intelligent power tap 100 includes a fuse holder 121 that holds a replaceable fuse connected to the incoming supply voltage, which may be a 24V voltage input that provides power to the microcontroller 112, the network power, and the switched power. The fuse holder 121 may also connect to a first filter circuit 118 and a second filter circuit 128. The intelligent power tap 100 may also include two additional fuse holders similar to 121, one in line with the first filter circuit 118 and one in line with the second filter circuit 128.

As shown in FIG. 1A, the intelligent power tap 100 includes four power input terminals ($NP+_{IN}$, $NP-_{IN}$, $SP+_{IN}$, $SP-_{IN}$) and four power output terminals ($NP+_{OUT}$, $NP-_{OUT}$, $SP+_{OUT}$, $SP-_{OUT}$). The input power terminal $NP+_{IN}$ is for the incoming network power, the input power terminal $NP-_{IN}$ is a ground terminal for the incoming network power. The input power terminal $SP+_{IN}$ is for the incoming switched power and the terminal $SP-_{IN}$ is a ground terminal for the incoming switched power. Correspondingly, the output power terminal $NP+_{OUT}$ is for the injected or outgoing network power, the output power terminal $NP-_{OUT}$ is a ground terminal for the outgoing network power. The output power terminal $SP+_{OUT}$ is for the injected or outgoing switched power and the terminal $SP-_{OUT}$ is a ground terminal for the outgoing switched power.

The intelligent power tap 100 further includes a selector 116 connected directly to the microcontroller or between the input power terminals ($NP+_{IN}$, $NP-_{IN}$, $SP+_{IN}$, $SP-_{IN}$) and the output power terminals ($NP+_{OUT}$, $NP-_{OUT}$, $SP+_{OUT}$, $SP-_{OUT}$). The selector 116 may be a dip switch, a rotary switch, etc. By configuring the selector 116, the intelligent power tap 100 may be configured to work in one of the following four modes. In the first mode, the intelligent power tap 100 works as a first tap, which injects network power left (to the bridge in FIG. 1A) and right (to downstream nodes) and switched power to right (to downstream nodes). In the second mode, the intelligent power tap 100 works as a network power tap and a switched power tap, which injects network power and switched power to right. In the third mode, the intelligent power tap 100 works as a network power tap only, which injects network power to right. In the fourth mode, the intelligent power tap 100 works as a switched power tap, which injects switched power to right.

The intelligent power tap 100 may also include one or more current sensors. For example, the intelligent power tap 100 includes a current sensor 120 or 130 that senses at least one of a network current and a switched current to be injected into the network system. The first current sensor 120 is connected to a filter circuit 118 and a first switch 125 to shut off network power to other devices connected to the network power output. The current sensor 120 also sends the measured current signal to the microcontroller 112. The second current sensor 130 is connected to a second filter circuit 128 and a second switch 135 to shut off switched power to other devices connected to the switched power output. The second current sensor 130 also sends the measured current signal to the microcontroller 112. For example, the first switch 125 can be configured to shut off the network power to be injected into the network system based on a first command received from the microcontroller 112. The second switch 135 can be configured to shut off the switched power to be injected into the network system based on a second command received from the microcontroller 112.

The intelligent power tap 100 may also include current limit circuits in the current sensors 120 and 130. The current limit circuits may limit output current from the intelligent safety power tap within a preset current threshold, where the output current may include network output current or switched output current. For example, the first current sensor 120 includes a first current limit circuit connected to the first filter circuit and the network power output, where the first current limit circuit allows a first pre-defined excessive network output current during brief periods of high current demand. The second current sensor 130 includes a second current limit circuit connected to the second filter circuit and the switched power output, where the second current limit circuit allows a second pre-defined excessive switched output current during brief periods of high current demand.

For example, the intelligent power tap 100 can provide 'self protection' to the network power and/or switched power zone. When the intelligent power tap 100 detects the switched power limit circuit is active or the switched power current is greater than a preset allowable current for a predefined period of time the intelligent power tap 100 can independently shut down the power output to the switched power zone. The preset allowable current may be 4 A and the predefined period of time may be 100 ms.

Alternatively or additionally, a user may configure the voltage and/or current characteristics upon which the intelligent power tap 100 would shut down a zone of power. For example, the user may configure the voltage and/or current characteristics remotely via a network connection. Further, in a process application the user may not want to shut down a zone power, but rather configure the voltage and/or current characteristics upon which the intelligent power tap 100 would provide a warning of an over current, an under voltage, or some other power out of range condition.

The intelligent power tap 100 further includes a plurality of circuits 141, 142, 143, and 144 connected to the input power terminals ($NP+_{IN}$, $NP-_{IN}$, $SP+_{IN}$, $SP-_{IN}$) and the output power terminals ($NP+_{OUT}$, $NP-_{OUT}$, $SP+_{OUT}$, $SP-_{OUT}$). The circuits 141 and 142 may include switches that determine whether to connect network power input terminals $NP+_{IN}$, $NP-_{IN}$ directly to power output terminals $NP+_{OUT}$, $NP-_{OUT}$ and thus bypassing the power tap injection circuitry. The circuits 143 and 144 may include switches that determine whether to connect switched power input terminals $SP+_{IN}$, $SP-_{IN}$ directly to power output terminals $SP+_{OUT}$, $SP-_{OUT}$ and thus bypassing the power tap injection circuitry. At least one of the plurality of circuits 141, 142, 143, and 144 may include a configuration circuitry that defines a direction of power injection according to a power switching command from the microcontroller. For example, the plurality of circuits 141, 142, 143, and 144 may be controlled by the microcontroller 112 to define the direction of power injection.

The intelligent power tap 100 may further include a plurality of inject switches 145, 146, 147, and 148 connected to the power injection terminals (NP+, NP−, SP+, SP−). The inject switches 145 and 146 determine whether to inject network power while the inject switches 147 and 148 determine whether to inject switched power.

The microcontroller 112 is further configured to receive a broadcast message to shut down at least one of network power and switched power to all devices powered by or downstream of the intelligent power tap 100.

Figure 1B:
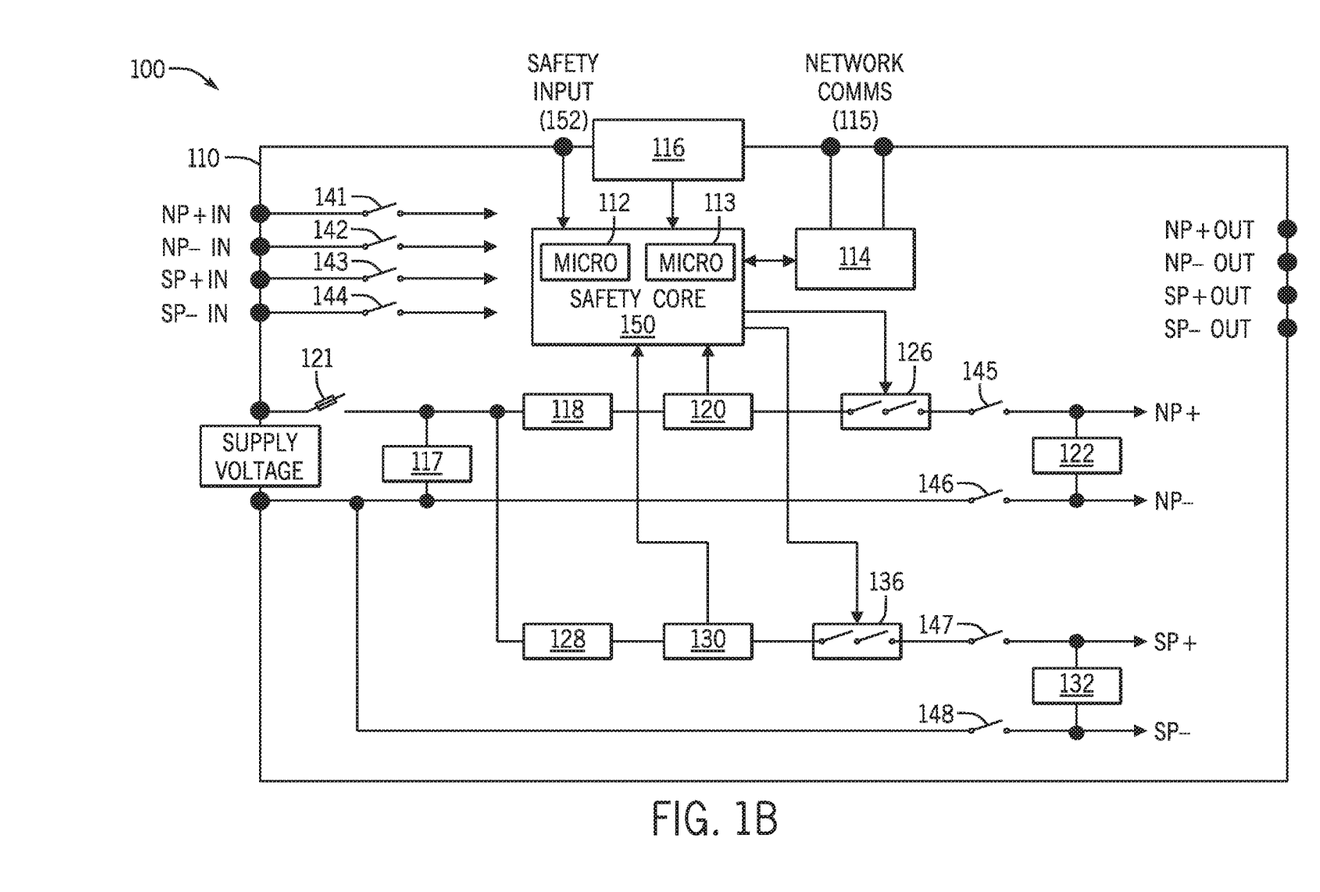
FIG. 1B illustrates a second example intelligent safety power tap according to one or more embodiments of the instant application.

FIG. 1B illustrates a second example intelligent power tap according to one or more embodiments of the instant application. In FIG. 1B, the intelligent power tap 100 includes a safety core 150 which includes at least one of a microcontroller 112 and a second microcontroller 113. The safety core 150 is capable of processing a safety message from the network system. For example, the safety core 150 may include a single or plurality of micro-controllers depending on the desired functional safety rating of the intelligent power tap and as required by a certified body. The safety core 150 can be capable of Common Industrial Protocol (CIP) Safety messaging or messaging using some other certified safety network protocol. A safety rated "Output" or "Shutoff" can be embedded within the intelligent power tap 100 so that a user/controller/master can command the intelligent power tap 100 via a safety network message to shutoff an individual or both network power or switched power zones. Thereby, the intelligent power tap 100 may achieve a "Safe-Off" condition for the desired zones. Further, a broadcast message can be sent to all power taps in the network to shut down all network power or switched power zones.

In FIG. 1B, the safety core 150 may include a dual-core architecture, which helps the intelligent power tap 100 to operate in safety critical applications. The intelligent power tap 100 may also be referred to as an intelligent safety power tap. Further, the intelligent safety power tap 100 can be configured to send one or more control devices in the network power zone to a safe state by shutting off network power to the one or more control devices in the network power zone. Additionally, the intelligent safety power tap 100 can be configured to send one or more control devices in the switched power zone to a safe state by shutting off switched power to the one or more control devices in the switched power zone.

The intelligent power tap 100 further includes a safety input 152, which an external safety sensor can be directly connected to, where the intelligent power tap 100 senses a safety demand via the safety input 152 and performs safety logic according to the safety demand. As a result of the safety demand, the safety core 150 may shut off the network power output or switched power output. The safety sensor connected at 152 may include an emergency stop pushbutton that is wired directly into the intelligent power tap 100. When the pushbutton is depressed or activated, the intelligent power tap 100 can sense the safety demand via the safety input 152, perform the safety logic, and command the safety rated "shutoff" to open, de-energizing the network power via safety switch 126 and/or switched power output via safety switch 136. The determination of which "Safety Shutoff" switch should open, if any, could be based on customer configuration.

In FIG. 1B, the safety core 150 can be configured to send a broadcast safety message to all power taps in the network system so that all power taps shut off network power to all network power zones in the network system. Additionally or alternatively, the safety core 150 may be configured to send a broadcast safety message to all power taps in the network system so that all power taps shut off switched power to all switched power zones in the network system. The safety core 150 may be further configured to receive a broadcast safety message instructing the safety power tap to shut off one or both of network power or switched power outputs.

Figure 2:
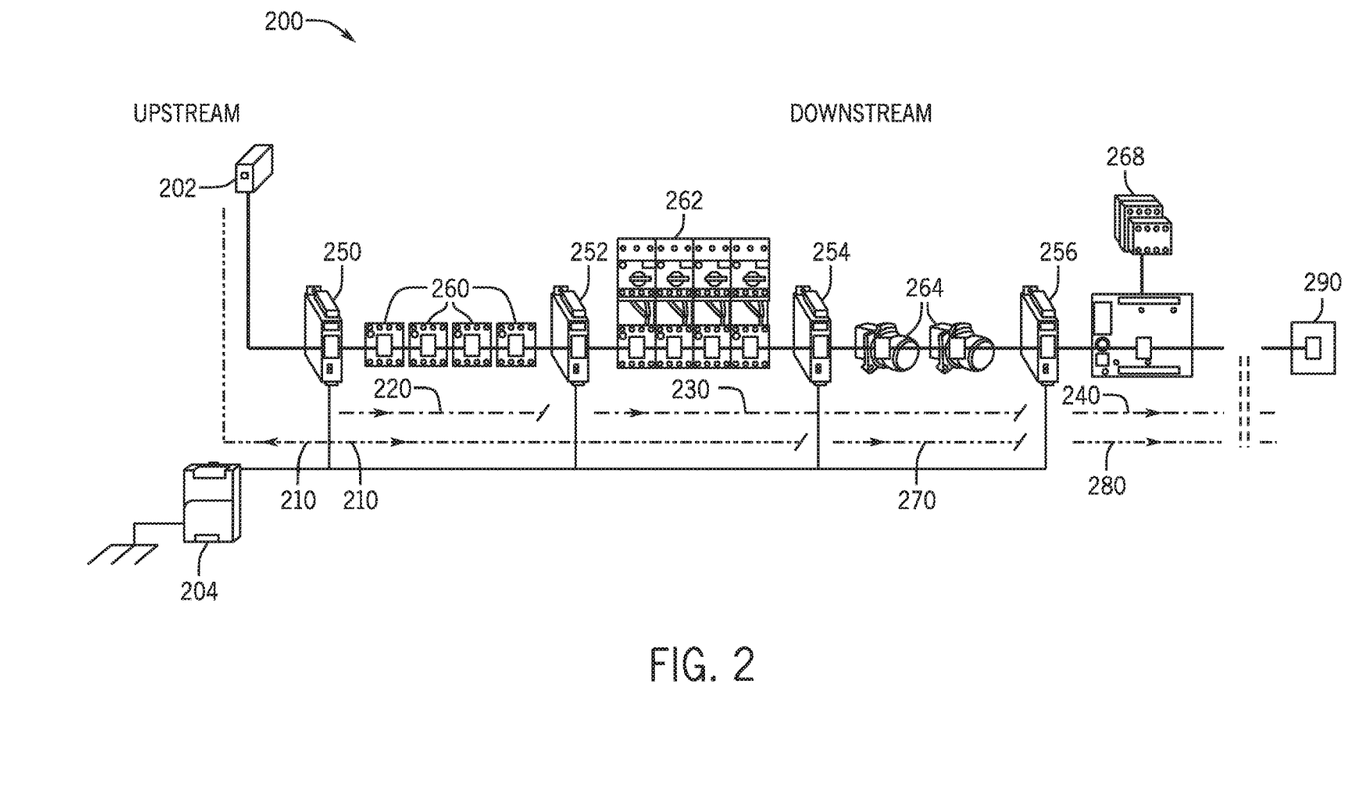
FIG. 2 illustrates an example system according to one or more embodiments of the instant application.

FIG. 2 illustrates an example system 200 according to one or more embodiments of the instant application. The system 200 includes a network power zone 210 and a switched power zone 220. The system 200 may include additional network power zones 270 and 280. The system 200 may include additional switched power zones 230 and 240. The network power zones may not overlap with each other. The switched power zones may not overlap with each other. The network power zone 210 may overlap with one of the switched power zones 220, 230, or 240. The network power zone 210 includes one or more devices such as power taps 250, 252, relays 260, and starters 262. The network power zone 270 includes one or more devices such as power tap 254 and push buttons 264. The switched power zone 220 may overlap with one of the network power zones 210, 270, and 280. The switched power zone 220 includes one or more devices such as power tap 250 and relays 260. The switched power zone 230 includes one or more devices such as power taps 252, 254, motor starters 262 and push buttons 264.

In FIG. 2, the power taps 252, 254 and relays 260 are downstream of the power tap 250. The power taps 250, 252, 254 and relays 260 are upstream of the safety power tap 256. The system 200 may also include additional network power zones which may not overlap with each other, but may overlap the switched power zones. The system 200 may also include additional switched power zones which may not overlap with each other, but may overlap the network power zones.

The system 200 may further include an intelligent power tap 250, 252 or 254, which may be configured to inject network power to the network power zone 210 and 270, or inject switched power to the switched power zones 220, 230 and 240. A master device 202 is connected to the intelligent power tap 250, which is configured to provide the geographical location on the network of the intelligent power tap, such as 250, to the master device 202.

Each of the intelligent power taps 250, 252 and 254 is further configured to provide diagnostics information to the master device in real time. The microcontroller is configured to send prognostics information to the master device 202 when receiving a request from the master device 202, or on a routine basis.

At least one intelligent safety power tap 256 may have a similar structure as the intelligent safety power tap 100 shown in FIG. 1B. The intelligent safety power tap may include a circuit board; a safety core disposed on the circuit board; and a physical layer network interface connected to the microcontroller and a physical network. Further, the intelligent safety power tap 256 may be configured to inject at least one of network power or switched power for network power zone 280 and switched power zone 270.

At least one intelligent safety power taps 256 is further configured to provide diagnostics information to the master device in real time. The microcontroller is configured to send prognostics information to the master device 202 when receiving a request from the master device 202, or on a routine basis.

At least one intelligent safety power tap 256 may be an intelligent power tap that includes a safety core configured to obtain a safety message from the network system 200. The intelligent safety power tap 256 is configured to send one or more control devices in the network power zone 280 to a safe state by shutting off network power to the one or more control devices in the network power zone 280. Additionally, the intelligent safety power tap 256 is configured to send one or more control devices in the switched power zone 270 to a safe state by shutting off switched power to the one or more control devices in the switched power zone 270. The safety core in the intelligent power tap 256 may further be configured to send a broadcast message to all power taps 250, 252 and 254 in the network system 200 so that all power taps shut off switched power to all switched power zones 220, 230, and 240 in the network system 200.

The intelligent power taps 250, 250, 254 and the intelligent safety power tap 256 may send one of the following warnings to other control devices in the network: an over-voltage warning when at least one of the network voltage and the switched voltage is greater than a preset upper voltage limit; an under-voltage warning when at least one of the network voltage and the switched voltage is lower than a preset lower voltage limit; an over-current warning when at least one of the network current and the switched current is greater than a preset upper current limit; and an under-current warning when at least one of the network current and the switched current is lower than a preset lower current limit.

Figure 3:
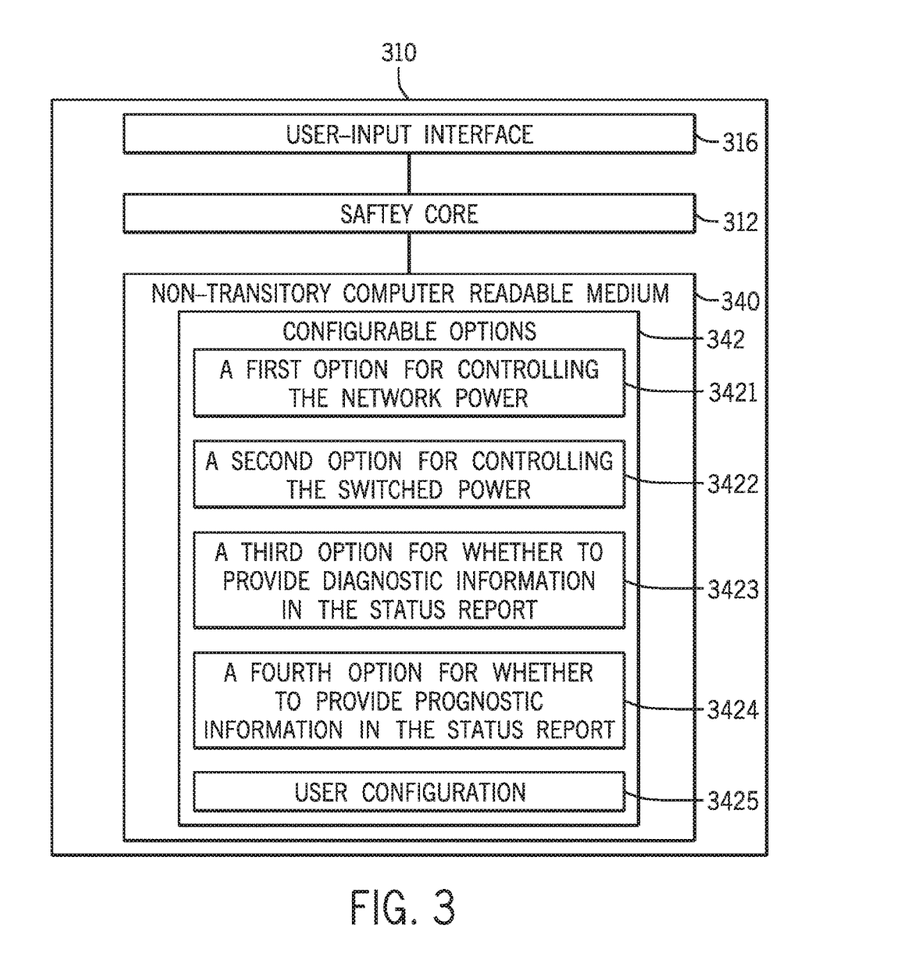
FIG. 3 illustrates an example tap according to one or more embodiments of the instant application.

FIG. 3 illustrates an example safety power tap 310 according to one or more embodiments of the instant application. The example safety power tap 310 includes a safety core 312 and a non-transitory storage computer readable medium 340, which include a plurality of configurable options 342. For example, the configurable options 342 may include one or more options that are configurable over the network system.

In FIG. 3, the configurable options 342 include at least one of the following options: a first option 3421 for controlling the network power; a second option 3422 for controlling the switched power; a third option 3423 for whether to provide diagnostic information in the status report; and a fourth option 3424 for whether to provide prognostic information in the status report. The configurable options 342 may also include user configurations 3425 which include the voltage and/or current characteristics disclosed above. The safety core 312 may determine whether to shut off a zone of power based on the voltage and/or current characteristics.

When the first option 3421 is selected, the safety core 312 may receive additional configuration from a master device enabling it to decide whether to shut off the network power via safety switch 126 in FIG. 1B based on the received additional configuration. When the second option 3422 is selected, the safety core 312 may receive additional configuration from a master device enabling it to decide whether to shut off the switched power via safety switch 136 in FIG. 1B based on the received additional configuration.

When the third option 3423 is selected, the safety core 312 may receive diagnostic information from one or more sensors in the example safety tap 310 and then provide diagnostic information in the status report to a master device or a node. When the fourth option 3424 is selected, the safety core 312 may receive diagnostic information from one or more sensors in the example safety tap 310 and then provide prognostic information in the status report to a master device or a node.

The prognostics information may include at least one of the following: an over-voltage warning when at least one of the network voltage and the switched voltage is greater than a preset upper voltage limit; an under-voltage warning when at least one of the network voltage and the switched voltage is lower than a preset lower voltage limit; an over-current warning when at least one of the network current and the switched current is greater than a preset upper current limit; and an under-current warning when at least one of the network current and the switched current is lower than a preset lower current limit. The prognostics information may also include an over-current warning based on a self-identification of a group of zone devices and their combined current characteristics.

The example safety tap 310 may also include a user-input interface 316 configured to receive current characteristics of a single or multitude of zone devices, where the prognostics information may include: a second over-current warning based on the current characteristics of the zone devices provided via the user-input interface.

Figure 4:
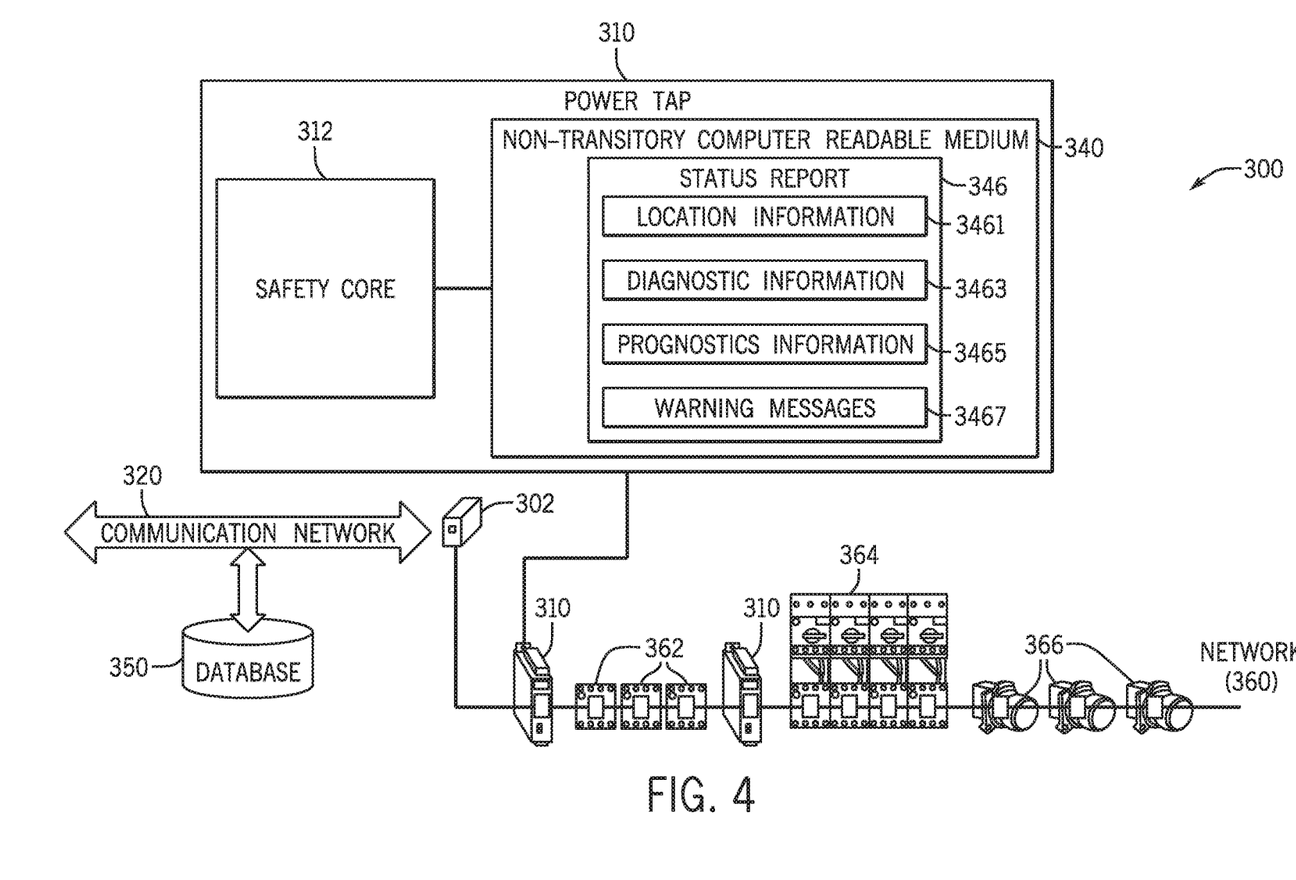
FIG. 4 illustrates an example network system according to one or more embodiments of the instant application.

FIG. 4 illustrates an example network system 300 according to one or more embodiments of the instant application. The network system 300 includes a network 360 consisting of a safety power tap 310. The safety power tap 310 includes a safety core 312 and a non-transitory computer readable medium 340. The communication network 320 may also be connected to a database 350 to record the usage information, diagnostic information, and prognostic information from the safety power tap 310.

Here, the safety power tap 310 may provide a status report 346 to one or more nodes in the network 360, which include a plurality of network nodes including relays 362, starter 364, etc. The power tap 310 also provides a status report to a communications bridge 302, which makes the information available to the communication network 320 so that the information may be stored in a database 350. The status report 346 includes location information 3461, diagnostic information 3463, prognostics information 3465, one or more warning messages 3467, and other user defined information.

For example, the prognostics information 3465 may include an over-current warning based on a self-identification of a zone device and its current characteristics. The prognostics information 3465 may further include a second over-current warning based on the current characteristics of the applicable zone devices provided via the user-input interface.

Figure 5:
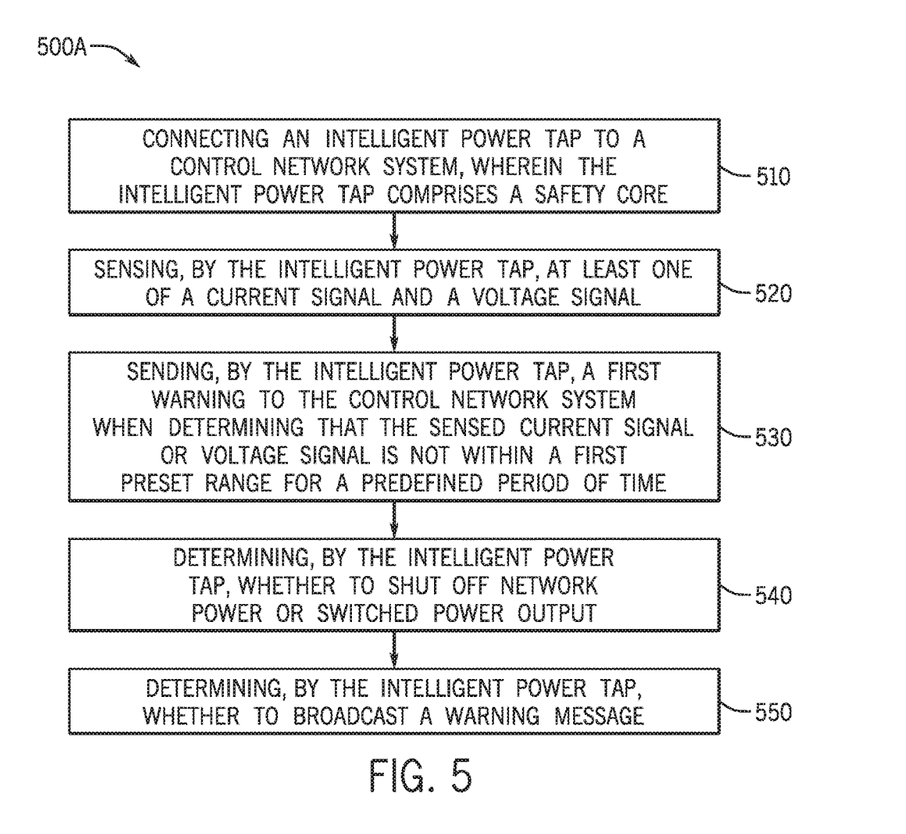
FIG. 5 illustrates an example flow chart according to one or more embodiments of the instant application.

FIG. 5 illustrates an example flow chart according to one or more embodiments of the instant application. The method 500A may be implemented by the intelligent power tap or the intelligent safety power tap disclosed above. The method 500A may include additional acts if needed. It is not required that the acts in the flow chart be executed as the specified order.

In act 510, an intelligent power tap is connected to a control network system, wherein the intelligent power tap may include a safety core. In act 520, the intelligent power tap senses a current signal and/or voltage signal. The current signal may be a current signal associated with network power output or switched power output. The voltage signal may be a voltage signal associated with network power output or switched power output.

In act 530, the intelligent power tap sends a first warning to the control network system when determining that the sensed current signal or voltage signal is not within a first preset range for a predefined period of time. For example, the first preset range of the current signal may include a working current range between 1 A and 4 A and a working voltage range between 11 VDC and 26.4 VDC. The predefined period of time may be 100 ms or more.

In act 540, the intelligent power tap or network master compares the sensed conditions against the configurable options to determine whether to shut off network power or switched power output. In act 550, the intelligent power tap checks the configurable options to determine whether to broadcast a warning message.

Figure 6:
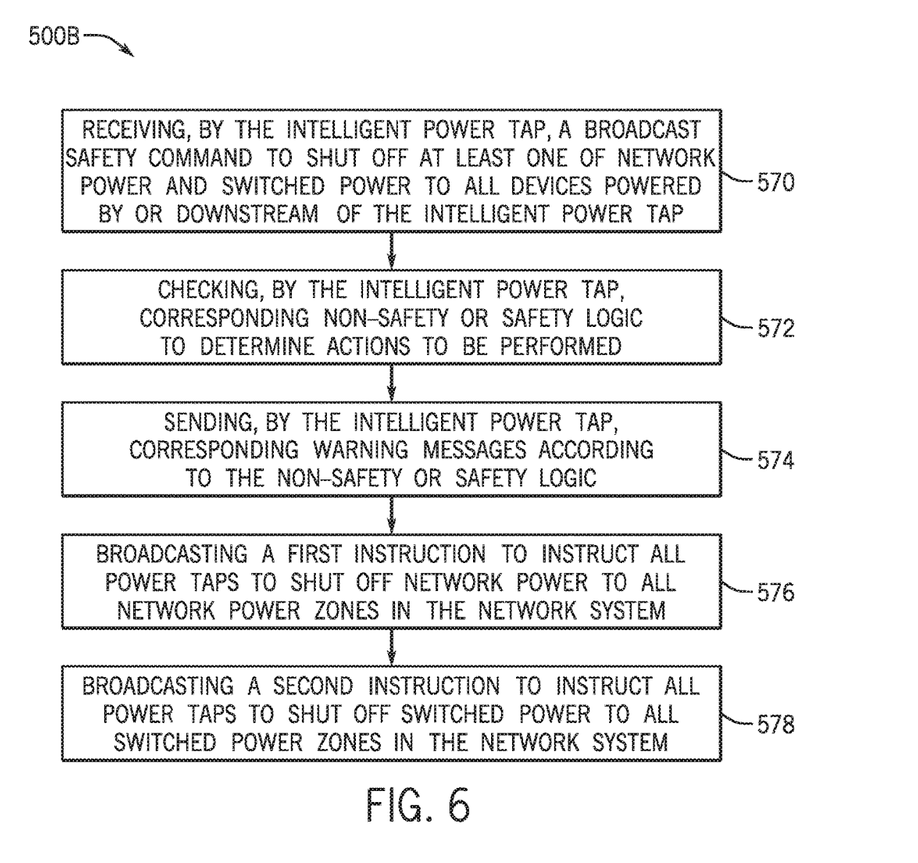
FIG. 6 illustrates additional acts in an example flow chart according to one or more embodiments of the instant application.

FIG. 6 illustrates additional acts in an example flow chart 500B according to one or more embodiments of the instant application.

In act 570, the intelligent power tap receives a broadcast safety message to shut off at least one of network power and switched power to all devices powered by or downstream of the intelligent power tap. A safety demand may also be detected by the intelligent power tap when a safety sensing device is wired to the dedicated safety input (152 in FIG. 1B) located within the intelligent power tap.

In act 572, the intelligent power tap checks corresponding non-safety or safety logic to determine actions to be performed. In act 574, the intelligent power tap sends corresponding warning messages according to the non-safety or safety logic. For example, the intelligent safety power tap may send a first over-voltage warning when the sensed network voltage is greater than a first voltage threshold. The intelligent safety power tap may send a first under-voltage warning when the sensed network voltage is less than a second voltage threshold. The intelligent safety power tap may send a second over-voltage warning when the sensed switched voltage is greater than a third voltage threshold. The intelligent safety power tap may send a second under-voltage warning when the sensed switched voltage is less than a fourth voltage threshold. The intelligent safety power tap may sends a third over-voltage warning when the sensed incoming voltage is greater than a fifth voltage threshold. The intelligent safety power tap may send a third under-voltage warning when the sensed incoming voltage is less than a sixth voltage threshold.

In act 576, the intelligent power tap broadcast a first instruction to instruct all power taps to shut off network power to all network power zones in the network system. In act 578, the intelligent power tap broadcast a second instruction to instruct all power taps to shut off switched power to all switched power zones in the network system.

The intelligent safety power tap achieves a "Safe-Off" condition for the desired zones in a network connected to the intelligent safety power tap. Further, the intelligent safety power tap enables a user to send a broadcast message to all power taps to shut down all network power and/or switched power zones in an emergency situation or to save energy.

The described features, structures, or characteristics of the embodiments may be combined in any suitable manner in one or more embodiments. In the description, numerous specific details are recited to provide a thorough understanding of embodiments of the disclosure. One skilled in the relevant art will recognize, however, that the embodiments may be practiced without one or more of the specific details, or with other methods, components, materials, and so forth. In other instances, well-known structures, materials, or operations are not shown or described in detail to avoid obscuring aspects of the disclosure.

Although the above discussion discloses various exemplary embodiments of the disclosure, it should be apparent that those skilled in the art can make various modifications that will achieve some of the advantages of the disclosure without departing from the true scope of the disclosure.

We claim:

1. An intelligent power tap in a network system, comprising:

a circuit board;
a microcontroller disposed on the circuit board, wherein the microcontroller is configured to report a geographical location of the intelligent power tap;
a physical layer network interface connected to the microcontroller and the network system;
a switch controlled by the microcontroller, wherein the switch is capable of shutting off a network power to be injected into the network system; and
a second switch controlled by the microcontroller, wherein the second switch is capable of shutting off a switched power to be injected into the network system.

2. The intelligent power tap of claim 1, further comprising:
a first voltage sensor that senses incoming voltage to the intelligent power tap; and
a second voltage sensor that senses a network voltage to be injected into a network power zone of the network system; and
a third voltage sensor that senses a switched voltage to be injected into a switched power zone of the network system.

3. The intelligent power tap of claim 2, wherein the microcontroller is configured to shut off the network power and broadcast a first warning message over the network system when determining that the network voltage is not within a first preset voltage range for a preset period of time; and wherein the first preset voltage range is defined by a first and second voltage thresholds.

4. The intelligent power tap of claim 2, wherein the microcontroller is configured to shut off the switched power and broadcast a second warning message over the network system when determining that the switched voltage is not within a second preset voltage range for a preset period of time; and wherein the second preset voltage range is defined by a third and fourth voltage thresholds.

5. The intelligent power tap of claim 1, further comprising:
a first current sensor that senses a network current to be injected into a network power zone of the network system; and
a second current sensor that senses a switched current to be injected into a switched power zone of the network system.

6. The intelligent power tap of claim 1, further comprising:
a configuration circuitry that defines a direction of power injection according to a power switching command from the microcontroller.

7. The intelligent power tap of claim 1, wherein the microcontroller is configured to receive a broadcast message to shut down at least one of network power and switched power to all devices powered by or downstream of the intelligent power tap.

8. An intelligent safety power tap in a safety or non-safety network system, comprising:
a circuit board;
a safety core on the circuit board, the safety core comprising one or more microcontrollers, wherein the safety core is capable of obtaining a safety message from the safety network system, and the safety core is configured to send a broadcast safety message to all power taps in the safety network system so that all power taps shut off network power to all network power zones in the safety network system;
a physical layer network interface connected to the safety core and the safety network system; and
a safety switch controlled by the safety core, wherein the switch is capable of shutting off power for at least one of a network power zone and a switched power zone in the safety network system.

9. The intelligent safety power tap of claim 8, further comprising a safety input directly connected to a safety sensor, wherein the intelligent safety power tap senses a safety demand via the safety input and performs safety logic according to the safety demand.

10. The intelligent safety power tap of claim 8, wherein the safety core is configured to send a broadcast safety message to all power taps in the safety network system so that all power taps shut off switched power to all switched power zones in the safety network system.

11. The intelligent safety power tap of claim 8, wherein the safety core is configured to receive a broadcast safety message to shut off at least one of network power and switched power to all devices powered by or downstream of the intelligent safety power tap.

12. A network system comprising:
a switched power zone comprising one or more control devices;
an intelligent safety power tap configured to inject switched power to the switched power zone;
wherein the intelligent safety power tap is configured to send one or more control devices in the switched power zone to a safe state by shutting off switched power to the one or more control devices in the switched power zone;
wherein the intelligent safety power tap comprises a safety core configured to obtain a safety message from the network system, a current limit circuit that limits output current from the intelligent safety power tap within a preset current threshold, a current sensor that senses a current to be injected into a network power zone, and a second current sensor that senses a current to be injected into the switched power zone; and
wherein the intelligent safety power tap sends an over-current warning when the sensed current is greater than a current threshold, and the intelligent safety power tap sends a second over-current warning when the sensed current is greater than a second current threshold.

13. The network system of claim 12, wherein the intelligent safety power tap further comprises a network voltage sensor that senses a network voltage to be injected into the network power zone; and
wherein the intelligent safety power tap sends a first over-voltage warning when the sensed network voltage is greater than a first voltage threshold.

14. The network system of claim 13, wherein the intelligent safety power tap sends a first under-voltage warning when the sensed network voltage is less than a second voltage threshold.

* * * * *